(12) United States Patent
Leitner (10) Patent No.: US 6,192,776 B1
(45) Date of Patent: Feb. 27, 2001

(54) CHUCK WITH COUPLING

(75) Inventor: Kajetan Leitner, Albstadt (DE)

(73) Assignee: Optigrip-Werkzeuge (DE)

( * ) Notice: Subject to any disclaimer, the term of this patent is extended or adjusted under 35 U.S.C. 154(b) by 0 days.

(21) Appl. No.: 08/935,019

(22) Filed: Sep. 22, 1997

(30) Foreign Application Priority Data

Mar. 21, 1995 (DE) .............................. 195 10 169

(51) Int. Cl.$^7$ ................................. B25B 23/00
(52) U.S. Cl. ............................... 81/429; 81/451
(58) Field of Search ............... 81/53.2, 429, 451; 279/75, 22, 30

(56) References Cited

U.S. PATENT DOCUMENTS

| 2,152,977 | * | 4/1939 | Schindel | 81/451 |
| 2,430,044 | * | 11/1947 | Campsmith | 81/451 |
| 4,237,946 | * | 12/1980 | Leitner | 81/429 |
| 4,753,142 | * | 6/1988 | Hornung | 81/429 |
| 4,809,572 | | 3/1989 | Sasaki . | |
| 5,341,708 | * | 8/1994 | Nick | 81/429 |
| 5,682,800 | * | 11/1997 | Jore | 81/451 |

FOREIGN PATENT DOCUMENTS

| 1293699 | * | 4/1969 | (DE) | 81/53.2 |
| 26 21 932 | | 11/1977 | (DE) . | |
| 3330962 | | 3/1985 | (DE) . | |
| 3429558 | | 2/1986 | (DE) . | |
| 086 352 | | 8/1983 | (EP) . | |

* cited by examiner

Primary Examiner—David A. Scherbel
Assistant Examiner—Joni B. Danganan
(74) Attorney, Agent, or Firm—Gabriel P. Katona L.L.P.

(57) ABSTRACT

The application relates to a chuck (10) with a coupling and a housing (34) for clamping cap-screws and/or studs having a screw spindle (11), a drive spindle (12) fixed axially in relation to the screw spindle (11) with at least one spring-loaded and axially movable coupling (18) which can be drivably secured to the screw spindle (11) by a counter-component (59) and a spring-loaded, axially movable adjusting sleeve (22) which can render the coupling inoperative. The coupling (18) has at least one projection or recess (6) which can be functionally engaged with a mating recess or projection on the counter-component (59).

28 Claims, 6 Drawing Sheets

CHUCK WITH COUPLING

FIELD OF THE INVENTION

The present invention relates to a coupling for chucks for tightening cap screws and/or studs.

BACKGROUND

Couplings of the above type are known and described for example in German patent Nos. 2,621,932 and 3,423,558. This coupling involves a stamped and bent component which for manufacturing reasons can have neither an optional thickness nor hardness. The known component, which is cold-hammered, is therefore subject to wear which, particularly when processing large wood screws which require a considerable screwing in torque to assemble them, very quickly makes its replacement necessary. Consequently replacement coupling discs must have been made available to the user who must replace these.

SUMMARY OF THE INVENTION

The purpose of the present invention is to develop an improved economical chuck of this type, so that the coupling is practically free of wear and can also be used under the hardest circumstances of operation.

It is recognized that the invention is realized when both the drive shaft and the screw shaft are provided with external polygons, which can be connected together in a power-locking fashion by a sleeve. The sleeve is in turn equipped with corresponding internal engaging polygons. By means of these polygons, which can be pushed on to one another to engage each other, the operational connection between the screw shaft and the drive shaft can be produced without problems. This coupling of the two shafts likewise provides no problems. In this case a coupling sleeve is used which is axially displaceable by an adjusting disc. A more detailed description of the function of the coupling sleeve and of the chuck is expressly described in related German patent No. 2,621,932 which shows a chuck of a bearing sleeve, a clamping sleeve, and a screw shaft. The clamping balls are radially displaceably disposed in the clamping sleeve, and surround the shaft of the screw that is to be screwed in. The clamping sleeve surrounds the bearing sleeve. The screw shaft passes through the bearing sleeve, it is axially displaceable and provided with a screw carrier. The bearing sleeve and the clamping sleeve are axially displaceable against the bias force of a spring in the same direction. The clamping sleeve has an clamping cone in the range of the clamping balls, and the clamping cone presses the clamping balls together under the pressure of the spring, and against the screw shaft. Space is provided axially, next to the clamping cone for locating the clamping balls therein as the screw is introduced. The polygons used in the invention are preferably in the form of hexagons. The hexagon of the drive shaft is suitably so formed that its width across corners roughly corresponds to the diameter of the shaft. In this way the minimum possible force is necessary for transmitting the torque.

BRIEF DESCRIPTION OF THE DRAWING

Some embodiments of the invention, given by way of example, are shown diagrammatically in cross-sectional views in the attached drawing, wherein.

DETAILED DISCLOSURE

Figure 1:
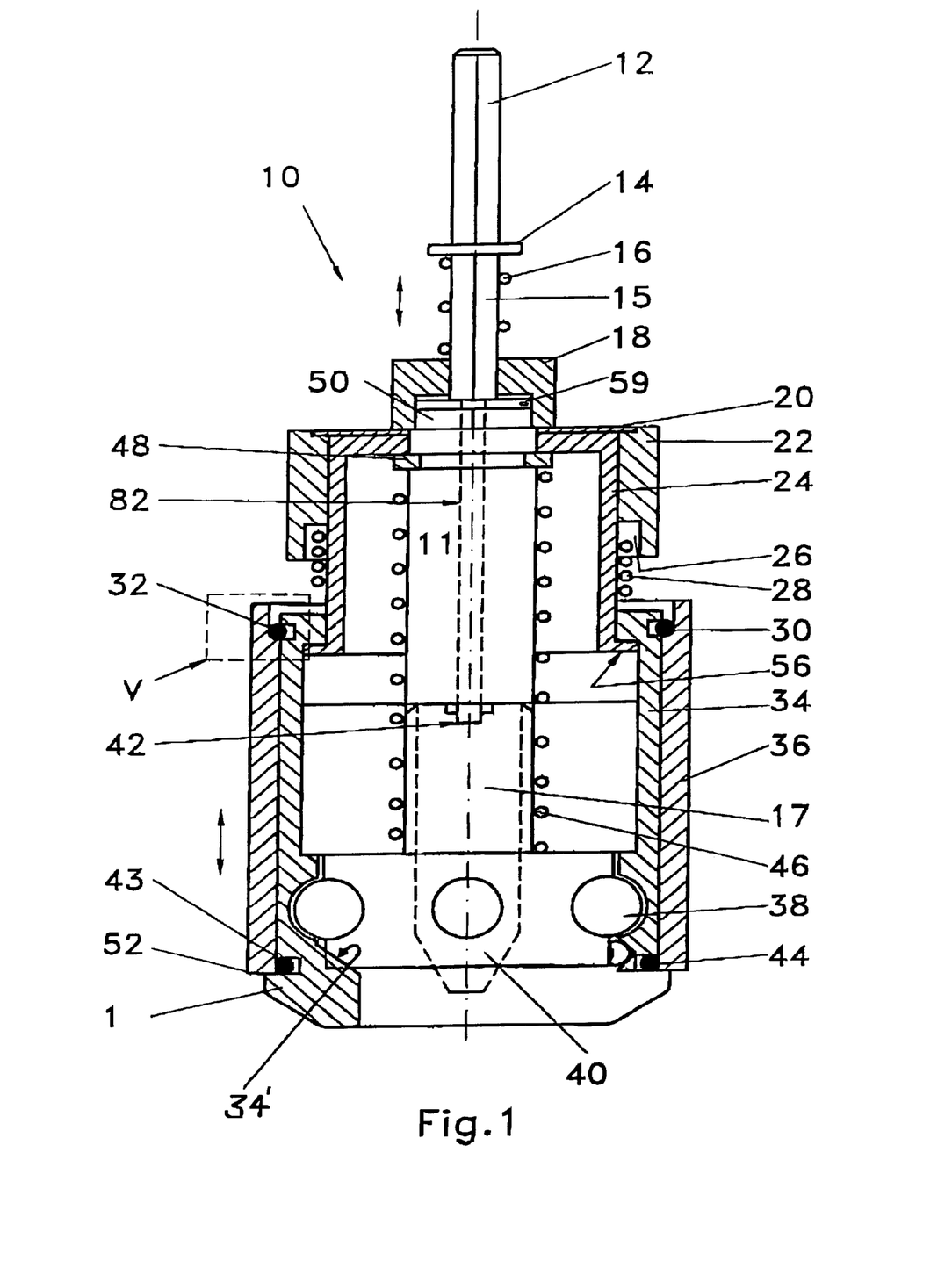
FIG. 1 is an axial cross-sectional view through a chuck of the invention.

FIG. 1 shows a chuck 10 for tightening cap screws and studs during their being tightened by screwing-in. The chuck 10 comprises a bearing sleeve (not shown) with clamping balls 38 surrounding the shaft of the screw to be tightened and radially displaceably mounted in the bearing sleeve, a clamp sleeve or casing 34 for the clamping balls 38 axially mounted and surrounding the bearing sleeve, and a screw sleeve or shaft 11 penetrating the bearing sleeve and provided with a screw driving means. In this case the clamp sleeve 34 and the bearing sleeve are longitudinally displaceable against the force of respective springs. The clamp sleeve 34 is provided in the area of the retaining position of the clamp balls 38 with a clamping cone 34', which, under the action of the spring tension, presses the clamping balls 38 together and thus against the shaft of the screw. Axially next to the clamping cone is a free space for receiving the clamping balls 38 when a cap screw is inserted. Both the bearing sleeve and the clamp sleeve 34 are under prestress in the same direction of respective springs which press these two sleeves from a counter-bearing lying at the rear end of the chuck 10 in the direction of the screw-in point. This counter-bearing has a counter-tube engaging in the clamp sleeve (casing 34), which receives coupling parts for delimiting the screw-in depth. The clamping cone (not shown) of the clamp screw 34 lies closer to the screw in point than its free space for the clamping balls 38.

A stop shoulder is provided between the clamping cone and the free space for limiting the path of the bearing sleeve to the screw-in point.

Figures 9, 10, 11:
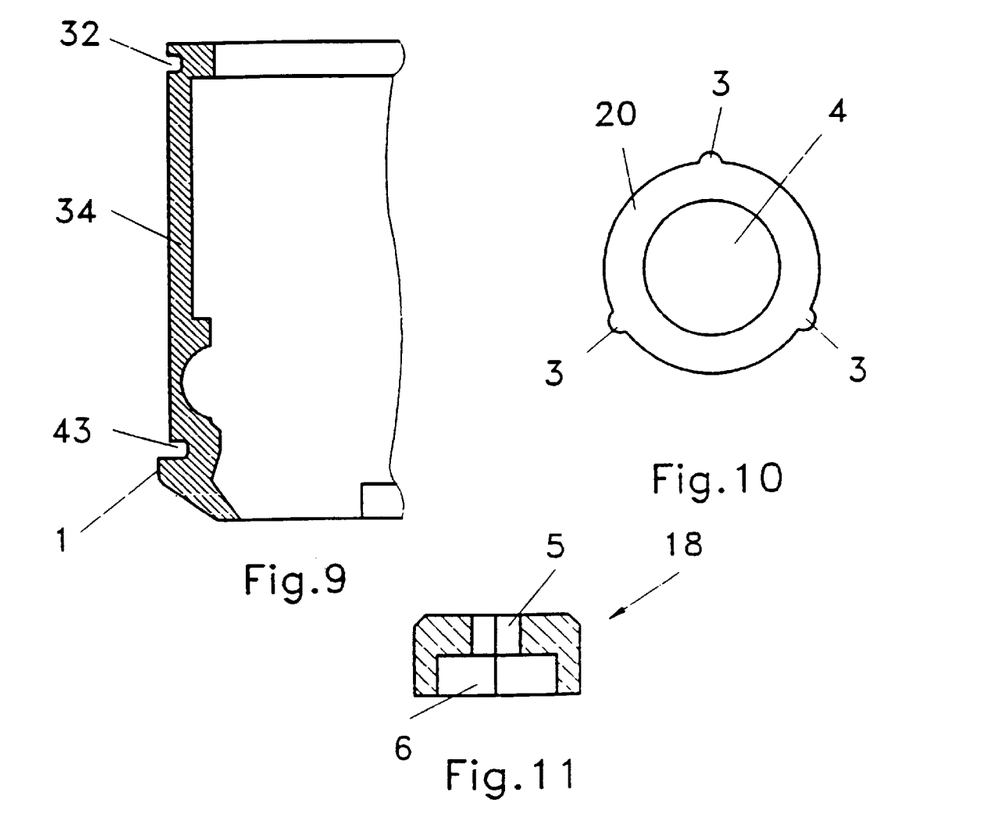
FIG. 9 is a half-shell from the chuck shown in FIG. 1, in axial cross-sectional view.
FIG. 10 is an adjusting disc in an axial plan view.
FIG. 11 is the coupling member from the chuck shown in FIG. 1 in axial cross-sectional view.

The chuck 10 shown in cross-section in FIG. 1 has a clamp sleeve casing 34 consisting of two shells for tightening cap screws and/or studs. The chuck 10 also has a screw shaft 11 and a drive shaft 12 disposed coaxially with respect to the screw shaft 11 with a spring-loaded coupling member 18 vertically displaceable in the direction of the double arrow and which can be operationally coupled with a counter-member component 50 of the screw shaft 11. There is also provided a spring-loaded, axially displaceable adjusting sleeve or adjustable adapter 22, which can bring the coupling member 18 out of operative engagement, and which is axially displaceable in the direction of the central double arrow. The coupling member 18 has a recess 6 (see FIG. 11) which can be brought into effective connection with the associated projection of the counter member or projection member 59. The projection 59 and the associated recess 6 face one another, and the projection 59 is housed in the recess 6 in an effective operational position of the coupling. Thus the projection 59 is complementary to the recess 6 and has an out-of-round cross-section. In the suitable embodiment shown in FIG. 1, the projection 59 has a hexagonal cross-section, which can be closely fitted in the correspondingly shaped recess 6. The coupling member 18 is a sleeve which can be non-rotatably connected to the drive shaft 12 and axially displaceable thereon, and which is axially biased by a helical or spiral spring 16. The helical spring 16 is disposed and compressed between a snap ring 14 and the outer side of the coupling member 18. The helical spring 16 presses the coupling member 18 against the adjusting sleeve 22. The adjusting disc 20 shown in more detail in FIG. 10 is disposed between the adjusting sleeve 22 and the coupling member 18.

Figure 5:
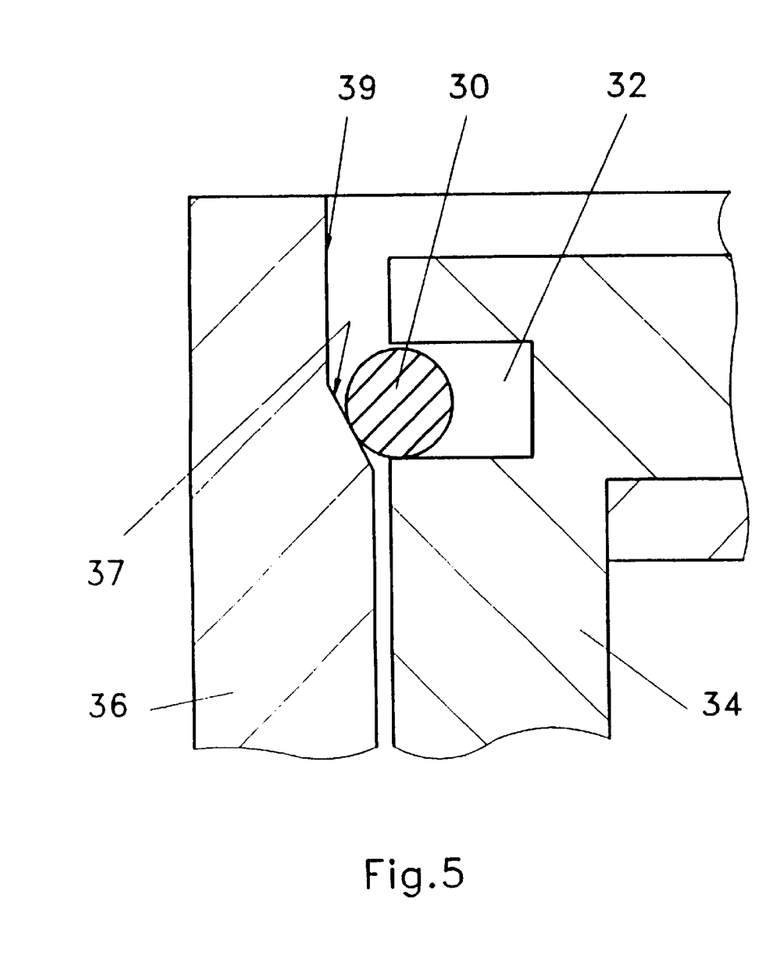
FIG. 5 is the portion of FIG. 1 within the area designated by V, shown on an enlarged scale.

The chuck 10 also includes an intermediate sleeve 24 which is securely connected to the screw shaft 11 by a connecting member 48. The lower end of the intermediate sleeve 24 has a collar 56, which supports the clamp sleeve casing 34. A helical spring 28 is disposed between the casing 34 and the adjustable adaptor 22 which projects into an annular groove which is open in a radially inward direction, in the adjusting sleeve adaptor 22. The helical spring 28 presses the adjustable adaptor 22 against the coupling member 18. The force of the helical spring 26 is however less in the axial direction than the force of the helical spring 16, so that, in the inoperative position of the chuck, the adjustable adaptor 22 adopts the position shown in FIG. 1. The casing 34 comprises two identical half shells made of plastics or metal, with axially extending points of abutment. The external periphery of the casing 34 is approximately cylindrical. Two annular grooves 32 and 43 are formed in the external wall of the casing 34, which are radially outwardly open, and each of which accommodates a clamp ring 30, 44. The casing 34 is form-lockingly surrounded by an axially movable cylindrical sleeve 36. The sleeve 36 is supported on one axial end face on the collar 1 of the casing 34, and as shown in FIG. 5, in the region of the other axial end of the sleeve 36, the clamp ring 30 projects out of its annular groove 32 and presses against the radially inner side of the sleeve 36. The sleeve 36 has an expanded diameter 39 with a frustoconical slant 37 in the region of the clamp ring 30. As shown in FIG. 5, the depth of the annular grooves 32, 43 is at least as great as the radially measured thickness of the clamp rings 30, 44. In the relaxed condition, the clamp ring 30 is only partially disposed in its annular groove 32. If the sleeve 36 is axially upwardly displaced with respect to the casing 34, i.e. in the direction of the coupling member 18, then the slant 37 presses against the clamp ring 30 and presses it into its groove 32, in which it is fully accommodated. Upon overcoming the radial inward pressure of the clamp ring 30, the sleeve 36 can be removed from the casing 34. The force which must be used at this point depends on the angle of the slant 37, which suitably has an angle from 10° to 50°. The clamp ring 44, which is disposed in its groove 43, and the clamp ring 30, can then be released from the casing 34, so that the two half-shells can be released from the chuck. The known clamping balls 38 are also housed within the casing 34, as are a bore 17 and a further helical spring 46.

If the casing 34 together with the sleeve 36 are displaced upwardly in an axial direction, then the upper end face of the casing 34 which is in a pressure contact with the adjustable adaptor sleeve 22, which in turn releases the coupling member 18 from the counter member 50 as the coupling member 18 is moved toward the snap ring 14. The coupling member 18 and the counter-member 50 are disengaged by separation from one another, so that the drive shaft 12 is no longer power-lockingly connected to the screw shaft 11. Thus rotations of the drive shaft 12 are thus no longer transmitted to the screw shaft 11.

Figure 2:
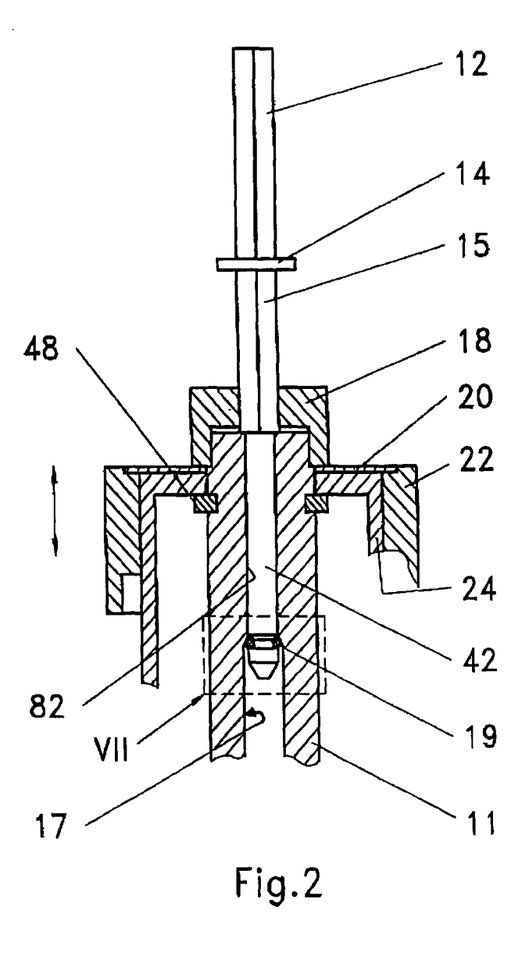
FIG. 2 is the upper portion of another chuck.
Figure 7:
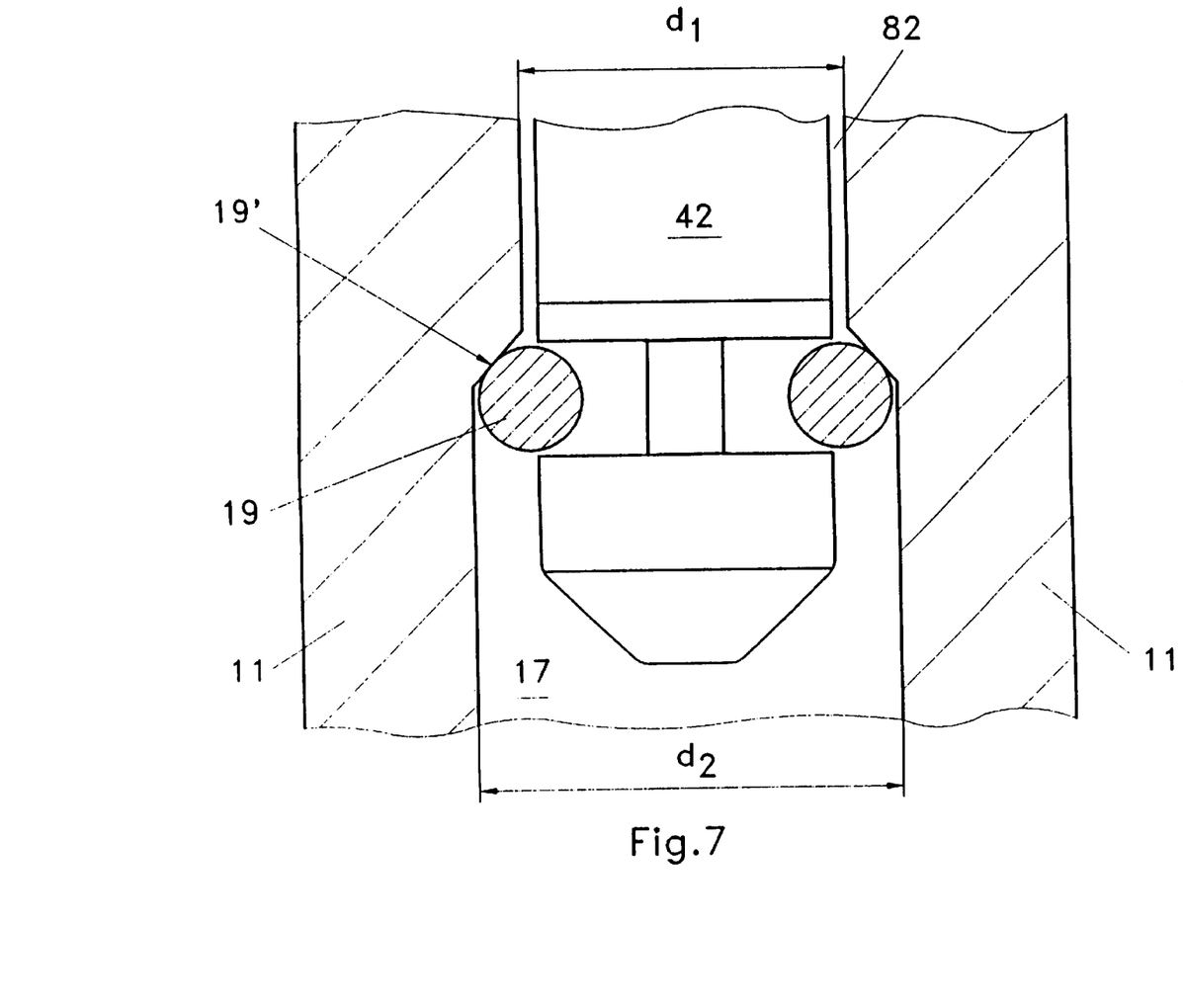
FIG. 7 is the portion within the area designated by VII, of FIG. 2 on an enlarged scale.

In FIGS. 2 and 7 it is shown that the screw shaft 11 includes a continuous bore 17 with a reduced diameter 82 whose internal diameter d1 is smaller than the diameter d2 of the bore 17. The extension 42 of the drive shaft 12 passes through the reduced diameter 82, the end in the extension 42 having an outwardly open radial annular groove thereon with a snap ring 19. This snap ring 19 is supported on a slant 19' between the bore 17 and the reduced diameter bores 82. In this manner the drive shaft 12 is axially immovably locked to the screw shaft 11.

Figure 3:
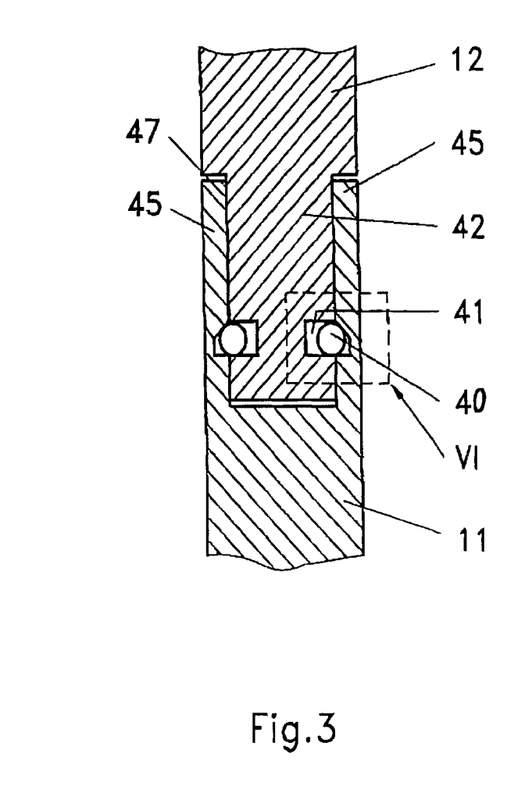
FIG. 3 is a connection between a screw shaft and a drive shaft.
Figure 6:
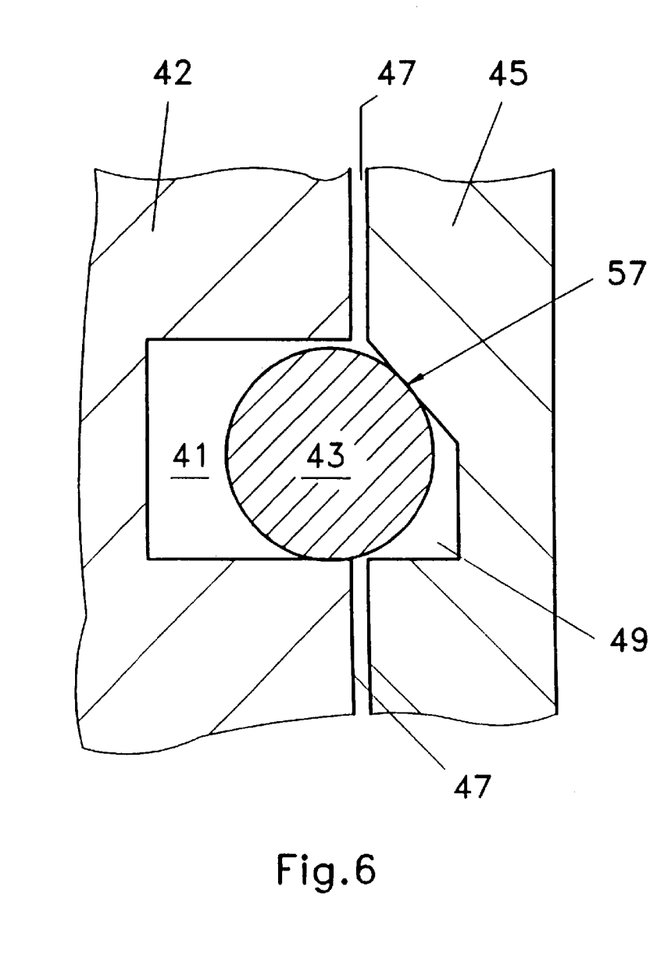
FIG. 6 is the portion of FIG. 3 within the area designated by VI, shown on an enlarged scale.

Another possible way of connecting the drive shaft 12 to the screw shaft 11 is shown in FIGS. 3 and 6. Formed in the screw shaft 11 is a blind bore 47 into which an extension 42 of the drive shaft 12 projects. The length of the blind bore 47 corresponds to the length of the extension 42. In its lower region, the extension 42 has a radially outward open annular groove 41, while a radially open annual groove 49 in the inside surface of the wall 45 of the blind hole 47 is provided with a slant 57. In its relaxed state, the clamp ring 40 is located partly in the annular groove 41 and partly in the annular groove 49. The radial depth of the annular groove 49 is so dimensioned that it corresponds to at most half the thickness (radius) of the clamp ring 40. In its operational position, the clamp ring 40 is supported on the slant 57, the angle of inclination of which can be suitably from to 10° to 60°. The greater the angle of inclination of the slant 57, the greater the force which must be used to release the extension 42 from the screw shaft 11. If an unreleasable connection is to be produced between these two components, then the angle of the slant 57 suitably becomes approximately 90°. If the extension 42 is now withdrawn from the blind hole 47, the slant 57 then presses against the clamp ring 40, so that it is displaced into the annular groove 41 so that the extension 42 can be released from the screw shaft 11. The two components can be both connected and released by this connection, without any difficulty. Thus there is a type of push-in connection involved, which is produced by displacement of two parts. Such problems as occur with screw connections (where screws with washers and a screwdriver are necessary) do not occur here. FIGS. 7, 8, 9 and 11 show further details of the components illustrated in FIG. 1.

FIG. 10 shows an adjusting disc 20 which has three knobs 3 projecting radially outwardly and a central opening 4. The depth of the screws to be screwed in can be set by the adjusting disc 20. This is described in more detail in German patent No. 2,621,932 as described earlier herein.

Figures 4, 4A:
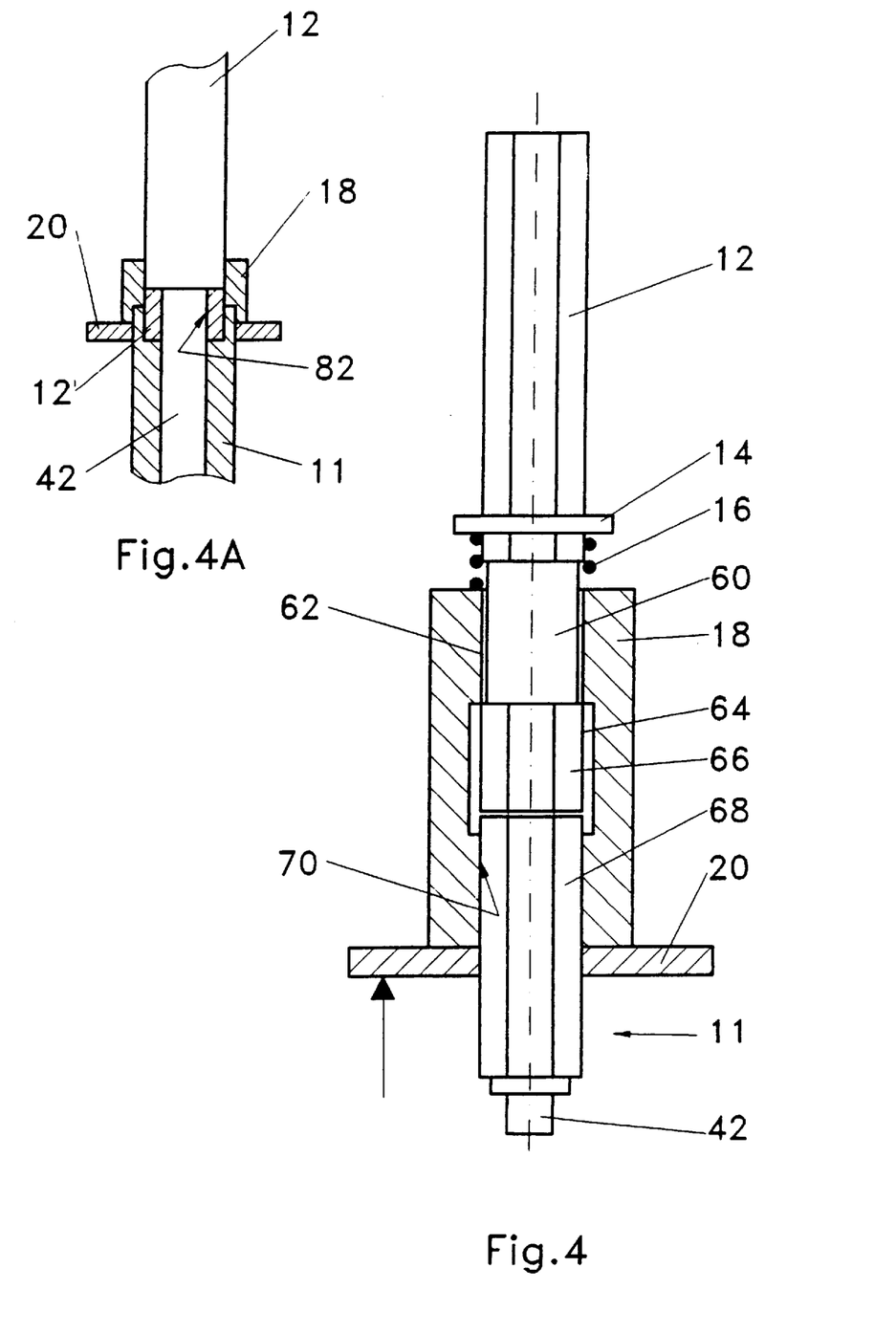
FIG. 4 is a further construction of the coupling.
FIG. 4a is an embodiment of a special construction of a coupling.

FIG. 4 shows another possible way of connecting the screw shaft 11 to the drive shaft 12. The coupling member 18, which is in the form of a sleeve, has a hexagonal opening 62, which operates in conjunction with the hexagonal collar 66 of the drive shaft 12 when the hexagonal collar 66 is disposed in the region of the hexagonal opening 62. A reduced diameter portion 60 of the drive shaft 12, having a circular cross-section is located between the hexagonal collar 66 and the disc 14. Thus in this region the drive shaft 12 is not in engagement with the coupling member 18. The coupling member 18 also has a cylindrical cavity portion 64, the internal diameter of which is greater than the width across corners of the hexagonal collar 66. The collar 66 can rotate in the portion 64 without contacting the coupling member 18. A lower portion 68 of the screw shaft 11 is non-rotatably connected to the coupling member 18. Axial displacement of the coupling member 18 in the direction of the arrow can be effected among other things with the aid of the adjusting disc 20. FIG. 4 shows the coupling members in their uncoupled condition.

Figure 8:
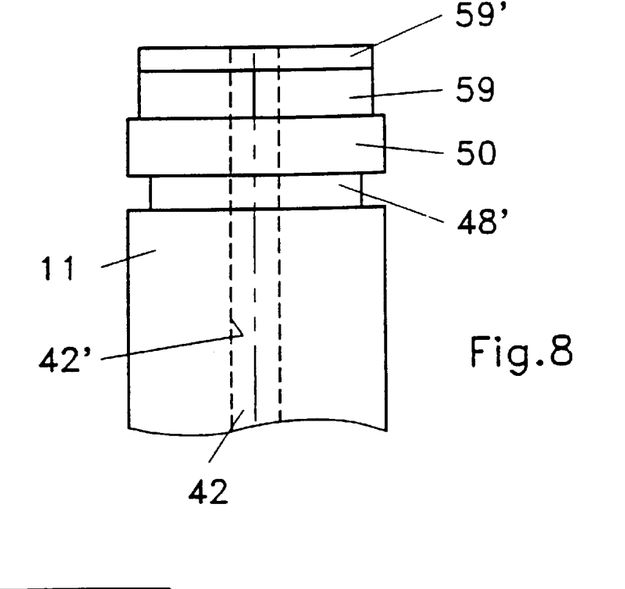
FIG. 8 is the upper end piece of the screw shaft shown in FIG. 1.

FIG. 8 shows the upper end portion of the screw shaft 11 on an enlarged scale. There can be seen an axial bore 42' for the extension 42. An annular groove 48' is formed for the connecting member or snap ring 48. Following the annular groove 48' is an annular collar 50, the diameter of which corresponds to the diameter of the top of the intermediate sleeve 24. Next to the cylindrical annular collar 50 is a hexagonal projection 59, the width across its corners corresponding to the external diameter of the screw shaft 11. In this way the screw shaft 11 need only be minimally machined. Next to the hexagon 59 is a cylindrically tapered portion 59', the external diameter of which corresponds to the key width of the hexagonal projection 59. This tapered portion centers and guides the coupling member 18 over the hexagonal projection 59.

In handling the apparatus it is of great advantage if, during the screwing-in procedure, the chuck 10 is securely held at its sleeve 36, as this enables precise and two-handed guidance of the hand drill. When screwing is carried out overhead with the chuck 10, e.g. in hard board or gypsum panels, it is unavoidable that chips or crumbs will drop into the chuck 10, so that it is necessary frequently to clean the chuck 10 by blowing the debris out. For this reason its internal parts must be accessible, i.e. the sleeve casing 34 must be capable of being removed rapidly and simply. This is achieved according to the invention by axially withdrawing the sleeve 36 from the casing in the direction of the frustoconical slant 37. This is possible because the slant 37 compresses the clamp ring 30 and moves it into the groove 32. The second clamp ring 44 is now freely accessible and can be easily pried out of its groove 43. The half-shells can then be opened and removed, the bottom end collar, the grooves 32, 43 and sleeve 36 also be so formed and disposed that removal of the rotatable sleeve 36 is possible in a forward direction, i.e. away from the drive shaft 12.

A further, particularly cost-effective construction of the coupling is shown in FIG. 4A, wherein there are provided a hexagonal drive shaft 12, a short intermediate part 12' with a hexagon of the same dimensions, and the coupling sleeve 18 with only one continuous internal hexagon which corresponds to the parts to be connected. The intermediate part 12' with its internal bore 82 for passage of the cylindrical extension 42 of the drive shaft 12 is nonrotatably connected to the screw shaft 11 and projects into the end thereof with its free end. Under spring pressure the coupling sleeve 18 connects the projecting portion of the intermediate part 12' to the drive shaft 12. In addition the coupling sleeve 18 extends over the screw shaft 11, serving for its control and concentric guidance. If the coupling sleeve 18 is displaced by the adjusting disc 20 in the direction of the drive shaft 12, it loses its engagement with the intermediate part 12' and in this way uncouples the drive shaft 12 from the screw shaft 11.

I claim:
1. A chuck with coupling, which comprises
(A) a casing for tightening screws or studs;
(B) a screw shaft;
(C) an adjustable sleeve;
(D) a drive shaft disposed coaxially with said screw shaft and said casing;
(E) a coupling member coaxially mounted from said drive shaft axially slidably thereon;
(E) a counter member for engagement with said coupling member;
(F) a first spring for urging said coupling member into engagement with said counter member;
(G) a second spring for urging said adjustable sleeve into engagement with said casing for the selective disengagement thereof from said counter member; and
(H) means on said coupling member for selectively engaging said counter member.

2. The chuck of claim 1, wherein said means for selectively engaging said counter member comprises a projection on said coupling member, and a recess on said counter member, for selective engagement with each other.

3. The chuck of claim 1, wherein said means for selectively engaging said counter member comprises a recess on said coupling member, and a projection on said counter member, for selective engagement with each other.

4. The chuck claim 1, further comprising a projection adjacent to said counter member; said projection having a noncircular cross-section.

5. The chuck of claim 4, wherein said noncircular cross-section is a polygon.

6. The chuck of claim 5, wherein said polygon is a hexagon.

7. The chuck of claim 6, wherein said coupling member is a sleeve nonrotatably mounted from said drive shaft, said coupling member having an interior space in the cross section of a hexagon.

8. The chuck of claim 5, wherein the diameter of said screw shaft is substantially the same as the distance between opposed corners of said polygon.

9. The chuck of claim 1, wherein said drive shaft has an axial extension adapted to project axially into said screw shaft for a nonrotatable connection therewith.

10. The chuck of claim 1, wherein said screw shaft further comprises a concentric blind hole therein, said drive shaft has an extension that selectively ranges into said blind hole, and the diameter of said blind hole corresponds to the diameter of said extension.

11. The chuck of claim 10, wherein said extension has a radially outward open first groove, and said blind hole has a radially inward open second groove that is in alignment with said first groove when said drive shaft and said screw shaft are in a selectively locked relationship with one another, and a resilient, annular snap ring, said second groove having a depth that is not larger than the diameter of the diameter of the cross-section of said snap ring.

12. The chuck of claim 11, wherein the edge of said second groove nearer to the end of said blind hole is frustoconically slanted toward the diameter of said blind hole, and merges into said blind hole.

13. The chuck of claim 1, wherein said screw shaft further comprises a reduced diameter bore portion the diameter of which is less than the diameter of said drive shaft, said drive shaft having an extension with a diameter corresponding to the diameter of said bore.

14. The chuck of claim 13, wherein said extension has a portion at the end of said drive shaft, said portion having a connecting member thereon with a diameter that is greater than the diameter of said bore.

15. The chuck of claim 14, wherein said portion at the end of said drive shaft has a groove, and said connecting member is a resilient ring disposed within said groove.

16. The chuck of claim 13, wherein the diameter of said reduced diameter bore portion expands in an axial direction opposite to the direction of said drive shaft, into an enlarged diameter bore portion of said screw shaft through a frustoconical taper.

17. The chuck of claim 13, further comprising an annular connecting member for selectively connecting said drive shaft to said screw shaft, when said drive shaft and said screw shaft are connected by said connecting member the diameter of said member is greater than the diameter of said reduced diameter bore portion.

18. The chuck of claim 17, wherein said annular connecting member is a resilient clamp ring, at least partially disposed within a groove.

19. The chuck of claim 18, wherein said groove is adjacent to or adjoins a frustoconical taper.

20. The chuck of claim 18, wherein said resilient clamp ring in an unstressed condition has a diameter that is greater than the width of aid groove.

21. The chuck of claim 1, further comprising a clamping cone having two half shells for selectively securely holding an implement between them.

22. The chuck of claim 21, wherein the periphery of said clamping cone is approximately cylindrical.

23. The chuck of claim 22, wherein said clamping cone has at least one radially outward open peripheral groove at its axial extremity.

24. The chuck of claim 23, wherein said clamping casing has two peripheral, outwardly open grooves therein, at a substantial axial spacing from each other.

25. The chuck of claim 24, wherein said clamping cone has a collar at its axial extremity, and said cylindrical sleeve is supported on said collar, the chuck further comprising a resilient clamp ring disposed within one of said grooves.

26. The chuck of claim 24, wherein said grooves each has a clamp ring therein, and the radial depth of each of said grooves is greater than the diameter of the cross-section of said clamp ring in the groove.

27. The chuck of claim 21, further comprising a cylindrical sleeve adapted partially to surround said clamping cone.

28. The chuck of claim 27, wherein said clamping cone has a collar at its axial extremity, and said cylindrical sleeve has an enlarged diameter at its axial end opposite to its end adjacent to said collar, said clamping casing further comprising a frustoconically slanting transition to said enlarged diameter.

* * * * *